United States Patent
Hussam

(10) Patent No.: US 10,467,921 B2
(45) Date of Patent: Nov. 5, 2019

(54) METHODS AND SYSTEMS FOR VIRTUAL PROBLEM BASED LEARNING

(71) Applicant: Universal Research Solutins, LLC, Columbia, MO (US)

(72) Inventor: Ali Adel Hussam, Columbia, MO (US)

(73) Assignee: Universal Research Solutions, LLC, Columbia, MO (US)

( * ) Notice: Subject to any disclaimer, the term of this patent is extended or adjusted under 35 U.S.C. 154(b) by 0 days.

(21) Appl. No.: 15/430,319

(22) Filed: Feb. 10, 2017

(65) Prior Publication Data

US 2017/0154544 A1 Jun. 1, 2017

Related U.S. Application Data

(63) Continuation of application No. 13/874,947, filed on May 1, 2013, now Pat. No. 9,569,978.

(60) Provisional application No. 61/783,924, filed on Mar. 14, 2013.

(51) Int. Cl.
 *G09B 7/02* (2006.01)
 *G09B 23/28* (2006.01)

(52) U.S. Cl.
 CPC ............... *G09B 7/02* (2013.01); *G09B 23/28* (2013.01)

(58) Field of Classification Search
 USPC ................................................. 434/262, 350
 See application file for complete search history.

(56) References Cited

U.S. PATENT DOCUMENTS

2002/0059261 A1 5/2002 Pollock
2008/0286740 A1 11/2008 Wi et al.

OTHER PUBLICATIONS

Office Action in corresponding U.S. Appl. No. 13/874,947, dated Apr. 7, 2015, pp. 1-4.

(Continued)

*Primary Examiner* — Kesha Frisby
(74) *Attorney, Agent, or Firm* — Fish & Richardson P.C.

(57) ABSTRACT

A computer-implemented method includes selecting, by a virtual problem-based learning (PBL) system, information indicative of a medical profile of a patient; accessing, by the virtual PBL system, information indicative of a team of students using the virtual PBL system; generating, by the virtual PBL system and based on the medical profile, an medical PBL schema comprising a medical problem to be solved by the team of students; generating a plurality of sections in the medical PBL schema, with each section promoting solving of the medical problem, and with each section associated with (i) a private work environment for a student to privately analyze the medical problem, and (ii) a shared, anonymous work environment for the students to view analysis performed by other students in solving the medical problem; and transmitting, to one or more client systems used by the students participating in the virtual problem-based learning system, the medical PBL schema.

29 Claims, 14 Drawing Sheets

(56) References Cited

OTHER PUBLICATIONS

Response to Office Action dated Apr. 7, 2015 in corresponding U.S. Appl. No. 13/874,947, filed Jul. 29, 2015, pp. 1-17.
Final Office Action in corresponding U.S. Appl. No. 13/874,947, dated Oct. 30, 2015, pp. 1-6.
Response to Final Office Action dated Oct. 30, 2015 in corresponding U.S. Appl. No. 13/874,947, filed Apr. 22, 2016, pp. 1-16.
Final Office Action in corresponding U.S. Appl. No. 13/874,947, dated Jun. 30, 2016, pp. 1-7.
Response to Final Office Action dated Jun. 30, 2016 in corresponding U.S. Appl. No. 13/874,947, filed Sep. 23, 2016, pp. 1-13.

FIG. 3A

300 — ePBL ******

Tabs: 304 HYPOTHESIS (YELLOW) | 306 LEARNING OBJECTIVES (GREEN) | 308 PROBLEM LIST (BLUE) | 310 OTHER INFO (PURPLE) — Kaitlyn Tester Toolbar: Arial ▼ 10 ▼ | A A | B I U | ≡ ≡ | A ▼ ƒ

302 (content):
- 40 YEAR-OLD MALE
- 2 WEEKS AGO: SUDDEN WEAKNESS LEFT ARM AND LEG; RESOLVED WITHIN AN HOUR
- FEVER AND HEART MURMUR
- HEAD CT SCAN AND ULTRASOUND OF CAROTID ARTERIES NEGATIVE
- ALLERGIC TO ASPIRIN
- IN INTERVENING 2 WEEKS: FEVER, NIGHT SWEATS, WEAKNESS, MUSCLE PAIN, HEADACHES, NAUSEA, VOMITING AND SHORTNESS OF BREATH WITH EXERTION —320
- SINCE SEPTEMBER (4 MONTHS): FEVER, FATIGUE, AND DECREASED APPETITE; HAS LOST ABOUT 30 POUNDS SINCE THEN; ILLNESS STARTED WITH A COUGH
- HAS BEEN TAKING ACETAMINOPHEN, IRON PILLS AND A VITAMIN PILL
- TWICE IN PAST 4 MONTHS HE LOST VISION BRIEFLY IN RIGHT EYE PMH
- TOLD HE HAD A HEART MURMUR AT AGE 28
- HERNIA REPAIR AT AGE 25 —316
- KNEE SURGERY AFTER AUTO ACCIDENT AT AGE 20 - HAD BLOOD TRANSFUSION
- NO HISTORY OF HYPERTENSION, DIABETES, CANCER OR OTHER CHRONIC DISEASE
- HAS HAD PROBLEMS WITH HIS TEETH FOR YEARS FH
- FATHER DIED AGE 65 - MI. MOTHER ALIVE WITH MACULAR DEGENERATION; 44-YEAR-OLD BROTHER AND 18-YEAR-OLD DAUGHTER HEALTHY SH
- SELF-EMPLOYED
- DIVORCED 5 YEARS
- SEXUALLY ACTIVE WITH GIRLFRIEND - NO CONDOMS —318
- HAS SMOKED CIGARETTES FOR 25 YEARS
- 1-2 SIX-PACKS OF BEER PER WEEKEND - RECENTLY REDUCED
- USED IV HEROIN SEVERAL TIMES AT AGE 19
- NO HEALTH INSURANCE

ACTION (EMR) (PE)

FIG. 3B

| 304 | 306 | 308 | 310 |
|---|---|---|---|
| HYPOTHESIS (YELLOW) | LEARNING OBJECTIVES (GREEN) | PROBLEM LIST (BLUE) | OTHER INFO (PURPLE) |

Kaitlyn Tester

- 40 YEAR-OLD MALE
- 2 WEEKS AGO: SUDDEN WEAKNESS LEFT ARM AND LEG; RESOLVED WITHIN AN HOUR FEVER AND HEART MURMUR
- HEAD CT SCAN AND ULTRASOUND OF CAROTID ARTERIES NEGATIVE
- ALLERGIC TO ASPIRIN
- IN INTERVENING 2 WEEKS: FEVER, NIGHT SWEATS, WEAKNESS, MUSCLE PAIN, HEADACHES, NAUSEA, VOMITING AND SHORTNESS OF BREATH WITH EXERTION — 322
- SINCE SEPTEMBER (4 MONTHS): FEVER, FATIGUE AND DECREASED APPETITE HAS LOST ABOUT 30 POUNDS SINCE THEN; ILLNESS STARTED WITH A COUGH
- HAS BEEN TAKING ACETAMINOPHEN, IRON PILLS AND A VITAMIN PILL
- TWICE IN PAST 4 MONTHS HE LOST VISION BRIEFLY IN RIGHT EYE

PMH
- TOLD HE HAD A HEART MURMUR AT AGE 28
- HERNIA REPAIR AT AGE 25
- KNEE SURGERY AFTER AUTO ACCIDENT AT AGE 20 - HAD BLOOD TRANSFUSION
- NO HISTORY OF HYPERTENSION, DIABETES, CANCER OR OTHER CHRONIC DISEASE
- HAS HAD PROBLEMS WITH HIS TEETH FOR YEARS

FH
- FATHER DIED AGE 65 [M] MOTHER ALIVE WITH MACULAR DEGENERATION; 44-YEAR-OLD BROTHER AND 18-YEAR-OLD DAUGHTER HEALTHY

SH
- SELF-EMPLOYED
- DIVORCED 5 YEARS
- SEXUALLY ACTIVE WITH GIRLFRIEND - NO CONDOMS — 324
- HAS SMOKED CIGARETTES FOR 2 YEARS
- 1-2 SIX-PACKS OF BEER PER WEEKEND - RECENTLY REDUCED
- USED IV HEROIN SEVERAL TIMES AT AGE 19
- NO HEALTH INSURANCE

ACTION (EMR) (PE)

ePBL
*******

Document
- Print
- Save As...
- Post Notation to Group

Highlight Selections
Use the Appropriate Highlighter to Add Information to Your Study 354 — Hypothesis
352 — Objective
         Problems
356 — Notes
358

Add Notation
Click and Stick the Notation Anywhere on the Document

Frontsheet_RTestguy.docx — 360

Patient Frontsheet (Richard Testguy)

Patient Referring Doctor Details
Referring Doctor **************
                 **************
General Notes    Choose a dictation
No Notes Available.

Patient Details                    Choose a Dictation
Patient Name         Spine Patient
PersonId 43344       Consented No
Date of Birth
01/01/2012 (0 yrs old)
(more details)
Height  5'4"    Weight 145 lbs
BMI     24.8865
***************

Legend : • Specialty • History

Chief Complaint-
Primary Reason for Visit - Mid-
Back Between Shoulder Blades
Onset: Nov 6th 2012
Pain Intensity
Personal Care (Washing,
Dressing, etc.)
Lifting
Walking
Sitting
Standing
Sleeping
Social Life
Traveling
Employment/Homemaking Treatments-
Treatments: Injections or Nerve
Blocks: TENS, Splints
Injections/Nerve Blocks :
Unsure - 3

366 — Persistent Steroidal
Injections Could be
Causing Prolonged
Weakness/Numbness Imaging Studies -
Imaging : Mri, Ct Would You Like to Post Your Notes to the Group?
Yes   No   368

FIG. 3C (Cont.)

| ePBL | Section 1.1 ⊙ (next) | | Scribe Tim Linder (log out) | |
|---|---|---|---|---|
| Section 1<br>Action: PE 432 | Section 2<br>Action: PE 434 | | Section 3<br>Action: EMR 436 | |
| Hypothesis<br><br>408 | Hypothesis<br><br>416 | | Hypothesis<br><br>424 | |
| Learning Objectives<br>~~Ultrasound of carotid arteries~~<br>Acetaminophen, iron pills and a vitamin pill<br>Macular degeneration 410 | Learning Objectives<br>Head CT scan and ultrasound of carotid arteries<br><br>418 | | Learning Objectives<br>~~CT scan and ultrasound~~ 438<br>Macular degeneration<br><br>426 | |
| Problem List<br>Sudden weakness left arm and leg<br>Fever and heart murmur<br>Lost about 30 pounds<br>Heart murmur<br>Problems with his teeth 412 | Problem List<br>Fever and heart murmur<br>MI<br><br>420 | | Problem List<br>Fever, weakness, muscle pain 440<br>~~Has lost about 30 pounds~~<br>He lost vision briefly in right eye 428<br>~~Heart murmur~~<br>~~Blood Transfusion~~<br>~~Smoked cigarettes for 25 years~~ | |
| Other Info<br>~~Allergies to aspirin~~<br>1-2 six-packs of beer per weekend 414 | Other Info<br>Blood Transfusion<br><br>422 | | Other Info<br>~~Allergies to aspirin~~ 430<br>MI 442 | |

METHODS AND SYSTEMS FOR VIRTUAL PROBLEM BASED LEARNING

CLAIM OF PRIORITY

This application is a continuation of and claims priority under 35 U.S.C. § 120 to U.S. application Ser. No. 13/874,947, which was filed May 1, 2013, which claims priority under 35 U.S.C. § 119(e) to provisional U.S. Patent Application 61/783,924, filed on Mar. 14, 2013, the entire contents of each of which are hereby incorporated by reference.

BACKGROUND

In an example, students may solve a problem through collaboration.

SUMMARY

In general, one innovative aspect of the subject matter described in this specification can be embodied in methods that include the actions of selecting, by a virtual problem-based learning (PBL) system, information indicative of a medical profile of a patient; accessing, by the virtual PBL system, information indicative of a team of students using the virtual PBL system; generating, by the virtual PBL system and based on the medical profile, an medical PBL schema comprising a medical problem to be solved by the team of students; generating a plurality of sections in the medical PBL schema, with each section promoting solving of the medical problem, and with each section associated with (i) a private work environment for a student to privately analyze the medical problem, and (ii) a shared, anonymous work environment for the students to view analysis performed by other students in solving the medical problem; and transmitting, to one or more client systems used by the students participating in the virtual problem-based learning system, the medical PBL schema.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In some implementations, the features include receiving, from the one or more client systems, analysis information indicative of an analysis performed by the one or more students; evaluating the received analysis information; generating, based on evaluating, feedback information; and transmitting the feedback information to at least one of the one or more client systems. In still other implementations, the features include associating one or more research tools with the private work environment, wherein the one or more research tools are selected from a group consisting of an Internet browser and an instant messaging tool.

In yet other implementations, the features include transmitting, to at least one of the one or more client devices, outcome data indicative of outcomes of patients with medical profiles that are similar to the selected medical profile, with the outcome data comprising comorbidity data. In still other implementations, the features include receiving, from the one or more client systems, analysis information indicative of an analysis performed by the one or more students; for a particular student, populating the private work environment of the student with a portion of the analysis information that is associated with the particular student; generating an anonymized view of the private work environment of the student; populating the shared, anonymous work environment with the anonymized view of the private work environment of the particular student and with anonymized views of other private work environments of others of the students.

In still other implementations, the features include receiving, from at least one of the one or more client systems used by a first student, information indicative of an annotation of information displayed in one of the anonymized views of a second student, with the first student differing from the second student; and updating the one of the anonymized views with the received annotation to promote learning by the second student. In yet other implementations, the feature include for a particular first section: receiving, from the one or more client systems, first analysis information indicative of an analysis performed by the one or more students; determining, from the received first analysis information, first recommended actions that are recommended by each of the students; determining an inconsistency among the first recommended actions; providing, to the one or more client systems, evaluation information to promote an understanding by the students of the medical problem; receiving, from the one or more client systems, second analysis information indicative of another analysis performed by the one or more students; determining, from the received second analysis information, second recommended actions that are recommended by each of the students; determining consistency among the second recommended actions; causing, based on determination of the consistency, the medical PBL schema to progress from the first section to the second section.

In still other implementations, the features include retrieving information indicative of a correct action for the particular first section; responsive to determining the consistency among the second recommended actions, generating a notification of whether the second recommended actions corresponds to the correct action. In yet other implementations, the second recommended actions comprise an action to perform surgery. In still other implementations, the feature include generating highlighting tools for annotation of the medical profile, wherein each one of the highlighting tools corresponds to attributes of the medical problem; receiving, by the computer system, information indicative of annotations of the medical profile; determining, by the computer system, at least a portion of the annotations that is selected using a particular one of the highlighting tools; identifying which one of the attributes corresponds to the particular one of the highlighting tools; and storing, in a data repository, the determined portion of the annotations in association with the identified one of the attributes.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 1B, 3A, 3B, 3C 4-6 are screen images of graphical user interfaces generated by the PBL system.

DETAILED DESCRIPTION

Figure 1A:
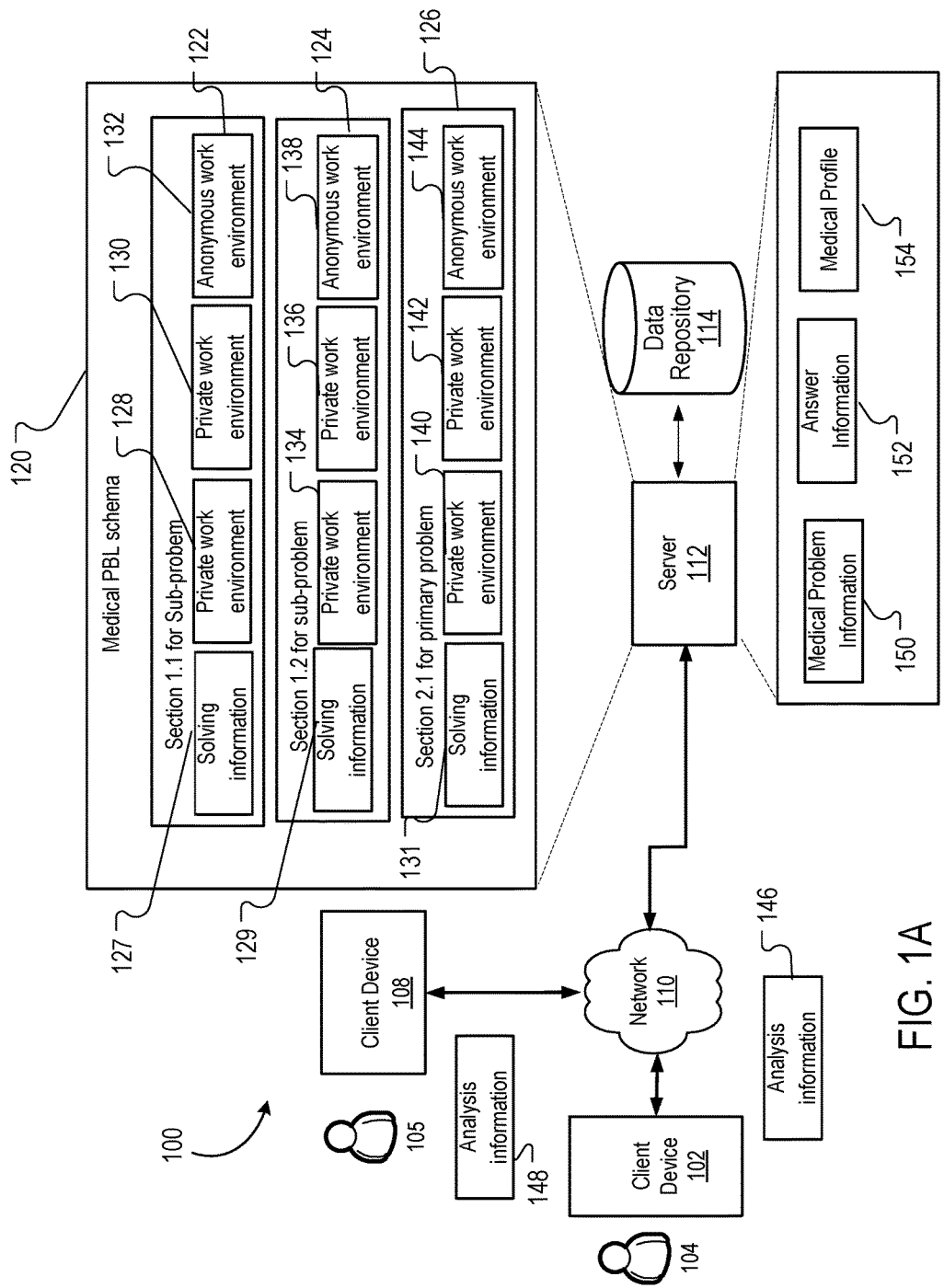
FIG. 1A is a block diagram of a PBL system.

Referring to FIG. 1A, network environment 100 includes client devices 102, 108, network 110, server 112 and data repository 114. Client device 102 is used by user 104. Client device 108 is used by user 105. In this example, users 104, 105 may be medical students who are studying for medical exams. Server 112 is a system for virtual, online promoting problem based learning (PBL) for medical students, including, e.g., users 104, 105. PBL is a student-centered pedagogy in which students learn about a subject through the experience of problem solving. PBL includes problems (e.g., medical problems) that are designed to challenge student to use problem solving techniques, to use self-directed learning strategies, to use team participation skills in solving the problem, and in using disciplinary knowledge in solving a problem. In PBL, a student analyzes a problem and determines what must be learned to solve the problem. The student constructs his/her own knowledge by looking for meaning and order. The student interprets what he/she hears, reads and sees based on past experiences and knowledge. In this example, knowledge has personal meaning and is constructed and organized by the learner. Learning is successful when the student demonstrates problem solving and the appropriate application of his/her knowledge.

To promote PBL, server 112 generates medical PBL schema 120, which includes a series of sections that promote solving of a medical problem. In an example, server 112 includes a virtual PBL system. Medical PBL schema 120 is based on a medical problem. A section in a medical PBL schema includes various information, including, e.g., a patient profile, videos, symptom information, and so forth. Medical PBL schema 120 includes sections 122, 124, 126.

In an example, a section in medical PBL schema 120 includes a private work environment, which is an online space (e.g., a virtual space) in which a student can make notes about the material presented in a section, edit the notes and review and study the material presented in a section. A section also includes an anonymous work environment, which includes an online space in which students can view the work done by other students (e.g., notes of other students) in the private work environment of the other students. In the anonymized work environment, the work of other students is presented in an anonymized format such that names of the students and other identifying information is removed.

In the example of FIG. 1A, section 122 includes private work environments 128, 130 and anonymous environment 132 (e.g., a public work environment that may be shared by multiple users). In this example, a private work environment is assigned to a particular user and represents a virtual work space in which the particular user can study and prepare notes. In this example, user 104 uses private work environment 128 and user 105 uses private work environment 130. Section 122 also includes anonymous work environment 132 for display of anonymized notes and other work product of users 104, 105.

Medical PBL schema 120 includes sections 124, 126. Section 124 includes private work environments 134, 136, which are used by users 104, 105, respectively. Section 124 also includes anonymous work environment 138, e.g., for presentation of anonymized notes of users 104, 105 for section 124. Section 126 includes private work environments 140, 142, which are used by users 104, 105, respectively. Section 124 also includes anonymous work environment 144, e.g., for presentation of anonymized notes of users 104, 105 for section 126.

Each of sections 122, 124, 126 includes solving information 127, 129, 131, respectively. As previously described, medical PBL schema 120 is based on a medical problem. For example, the problem may be correctly diagnosing a disease of a patient. In another example, the problem may be determining a type of surgery to be performed to address a medical condition of the patient. In still another example, the type of problem may be correctly identifying a type of implant to be inserted for a patient. In an example, an administrator (e.g., a medical doctor or other medical service provider) inputs into server 112 information specifying the problem to be solved (e.g., the problem is to correctly diagnose a medical condition of the patient). The administrator also inputs into server 112 answer information 152. Generally, answer information includes information specifying an answer to the medical problem. For example, the answer information may specify that the correct answer is that the patient suffers from dyslexia or another medical condition.

To assist the students (e.g., users 104, 105) in correctly identifying the answer to the medical problem represented in medical PBL schema 120, server 112 generates solving information. Generally, solving information includes information that promotes the solving of a medical problem. For example, the solving information includes information that promotes identification of the answer to a medical problem. Server 112 may be configured to automatically generate problem solving information (also referred to herein as solving information), as described in further detail below.

In an example, server 112 obtains, from data repository 114, medical problem information 150, including, e.g., information indicative of a medical problem to be solved by the students through interaction with the medical PBL schema 120. In this example, the medical problem is proper identification of a type of implant to be used during a surgical operation. The answer to the problem is that a particular type of hip implant should be used in performed a hip replacement surgery. To promote learning in a way that assists the students in answering the question, server 112 identifies various sub-problems to be addressed in solving the medical problem represented in the medical PBL schema 120. These various sub-problems include sub-problem I which is identification of a medical condition of a patient (e.g., degenerative hip disease) and sub-problem II which is identification of a type of surgery to be performed on the patient (e.g., hip replacement surgery). Answers to sub-problems I and II are used in identifying the main problem of the medical PBL schema 120, e.g., identification of a particular implant to be used during the hip replacement.

In this example, section 122 is associated with sub-problem I and promotes solving of sub-problem I. Section 124 is associated with sub-problem II and promotes solving of sub-problem II. Section 126 is associated with the main problem of medical PBL schema and promotes solving of the main problem. In an example, an operator of environment 100 and/or associates the sub-problems with each of sections 122, 124, respectively. In another example, server 112 accesses in data repository 114 information indicative of various sub-problems to be solved to promote learning and proper identification of the main problem (e.g., the primary problem associated with section 126).

To promote solving of the sub-problem associated with section 122, server 112 generates solving information 127. In an example, an operator may be configured to upload solving information 127 into server 112 and to specify that solving information 127 is to be associated with section 122 of medical PBL schema 120. In another example, server 112 generates solving information 127 by accessing a medical profile 154 of a patient of a specified type, e.g., a medical profile of a patient possessing the medical condition. Server 112 parses the medical profile 154 and selects information for inclusion in solving information 127. For example, medical problem information 150 may include information indicative a name of a disease (e.g., degenerative hip disease) that is experienced by a patient. Server 112 may be configured to identify, in medical problem information 150, the name of the disease and to select from the medical profile 154 information that is indicative of the disease (e.g., symptoms of the disease). In another example, server 112 accesses in data repository 114 a mapping of disease names to symptoms of the disease. Based on the mapping, server 112 identifies symptoms of the disease. Server 112 populates solving information 127 with the identified symptoms and/or with portions of medical profile 154 that pertain to the disease. In this example, solving information includes various types of information to promote students in solving subproblems and/or a primary problem of the PBL problem. For example, solving information may include symptoms. Solving information may also include outcome data indicative of outcomes of other patients with medical profiles that are similar to the medical profile on which medical PBL schema is based, with the outcome data comprising comorbidity data. The outcomes of the other patients (e.g., including the comorbidity data) may assist a student in predicting an outcome for the patient that is represented in medical PBL schema 120. The outcomes of the other patients (e.g., including the comorbidity data) may assist a student in determining a hypothesis, problem list and/or recommended action for the patient that is represented in medical PBL schema 120.

In the example of FIG. 1A, users 104, 105 are presented with solving information 127. Based on viewing solving information 127, users 104, 105 transmit, to server 112, analysis information 146, 148, respectively. Generally, analysis information includes information indicative of a user's analysis of the presented solving information. The analysis information may include notes of the user and a recommended action (e.g., an answer to a primary problem and/or an answer to a sub-problem). Client devices 102, 108 send analysis information 146, 148 to server 112, respectively. In an example, users may use private work environments 128, 130 for entry of analysis information 146, 148, respectively. For example, client device 102 may render a visual representation of private work environment 128. Through private work environment 128, user 104 may enter analysis information 146. In another example, client device 102 may transmit analysis information 146 to server 112. In response, server 112 may populate private work environment 128 with analysis information 146.

In this example, analysis information 146 includes a recommended action that was determined by user 104, including, e.g., a recommended action of a type of condition that is being experienced by the patient represented in solving information 127. Using analysis information 146, 148, server 112 generates information for population of anonymous work environment 132. In anonymous work environment, users 104, 105 can view the work of each other and can edit the work of each other, as described in further detail below.

In the example of FIG. 1A, users 104, 105 may access various tools in analyzing solving information 127. For example, users 104, 105 may access the Internet to look up types of medical conditions associated with the symptoms presented in solving information. In this example, user 104, 105 may access the Internet via the private work environments. In another example, section 122 includes various videos to assists a user in correctly identifying a condition of the patient presented in solving information 127.

Each item of analysis information 146, 148 includes a recommended action. Server 112 is configured to compare the recommended actions included in each of analysis information 146, 148. Upon determination of a match between the recommended action (e.g., consistency among the recommended actions), server 112 enables users 104, 105 to progress to the next section of medical PBL schema 120, e.g., section 124. In the example of FIG. 1, analysis information 146, 148 is for section 122 and is based on review of solving information 127, e.g., by users 104, 105.

Analysis information 146, 148 may include identifying information of users 104, 105, respectively, including, e.g., a user name of these users, a unique identifier for these users and so forth. In this example, server 112 is configured to remove the identifying information, e.g., to promote an anonymous display of analysis information 146, 148. In this example, anonymous work environment 132 displays the anonymized analysis information, e.g., for collaborative review by users 104, 105, as described in further detail below.

In the example of FIG. 1A, following progression by users 104, 105 to section 126, solving information 131 is transmitted to client devices 102, 108 for display to users 104, 105, respectively. In this example, section 126 is a section that is representative of the main problem, e.g., identification of a particular implant to be used during the hip replacement. As previously described, the answer to this main problem is included in answer information 152. Following review and analysis of solving information 131, client devices 102, 108 send additional analysis information (not shown) to server 112. This additional analysis information includes recommended actions, e.g., answers to the main problem. In this example, server 112 compares the recommended actions included in the additional analysis information. If server 112 determines a match between the recommended actions, then the server 112 determines that the users 104, 105 agreed on a consensus for a recommended action to take, e.g., an answer to the main medical problem represented in medical PNL schema 120. In this example, server 112 compares the consensus recommended action to answer information 152. If the consensus recommended action matches answer information 152, server 112 notifies users 104, 105 that they correctly solved the medical problem. If the consensus recommended action does not match answer information 152, server 112 notifies users 104, 105 that they incorrectly solved the medical problem and provides users 104, 105 with answer information 152 so that users 104, 105 may view the correct answer.

In another example, server 112 determines a mismatch between the recommended actions included in the analysis information for section 126, then the server 112 determines that the users 104, 105 failed to agree on a consensus for a recommended action to take, e.g., an answer to the main medical problem represented in medical PNL schema 120. In this example, server 112 does not compare the received recommended actions to answer information 152. Rather, server 112 notifies users 104, 105 that have not reached a consensus recommended action and provides users 104, 105 with (i) additional time to review solving information 131 and to generate new recommended actions, (ii) additionally solving information with which to generate new recommended actions, and/or (iii) evaluation information. Evaluation information is additional information that provides a student with additional hints, medical data, learning materials and so forth to promote correct determination of a recommended action.

Figure 1B:
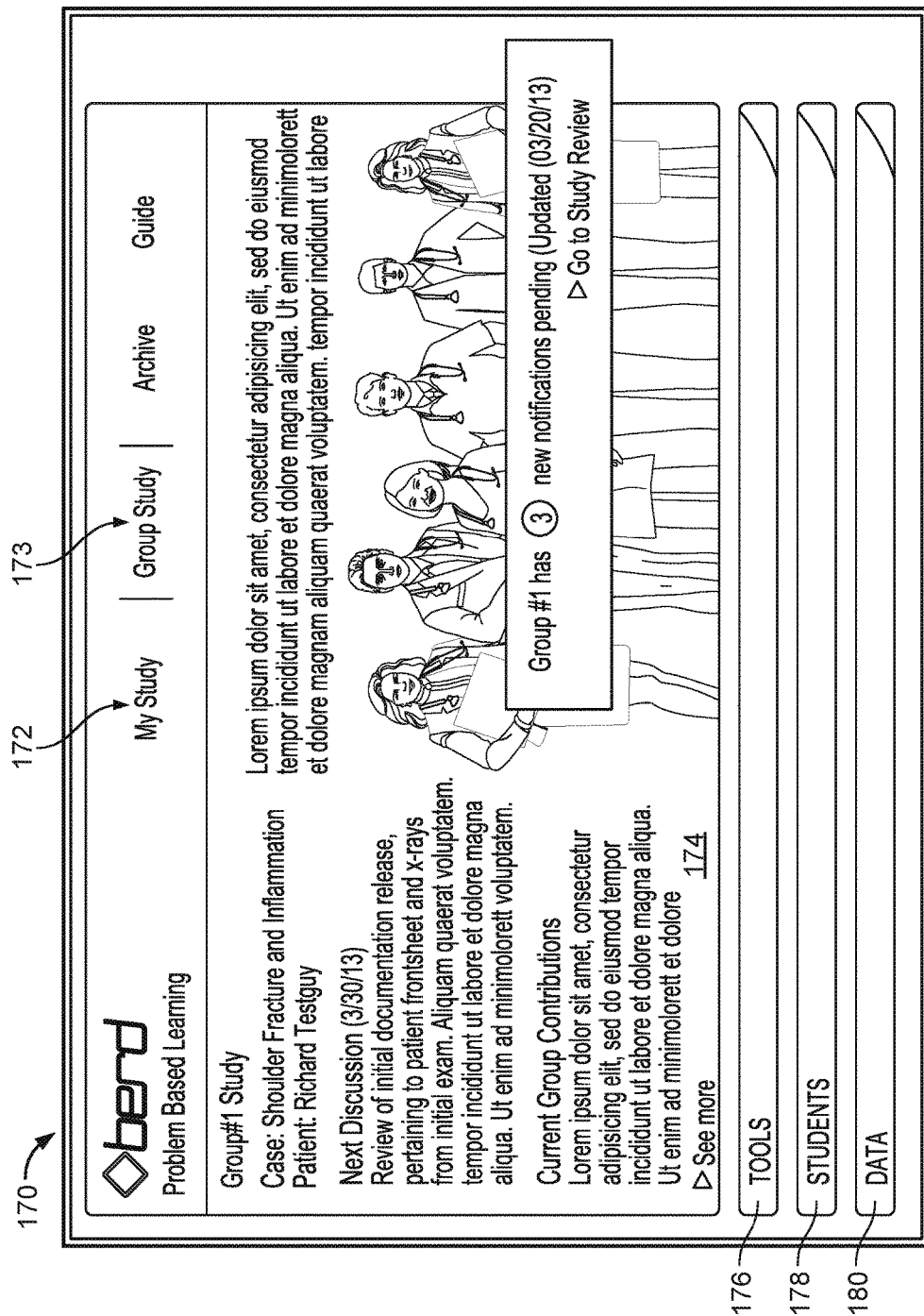

Referring to FIG. 1B, server 112 generates graphical user interface 170, e.g., to welcome a patient upon accessing the PBL system. In this example, the PBL system may be configured to host various types of studies, including, e.g., a personalized study and a group study, in which users collaborate with other users in a PBL environment. Control 172 enables a user to view a personalized study and/or to generate a study. Control 173 enables a user to view a group study to which the user has been selected for participation.

Graphical user interface 170 includes portion 174 to provide a user with an overview of a group study and to provide the user with a "current status" of the group study, e.g., a next discussion that the user needs to participate in and/or a listing of current notes and other contributions that have been made to the group by other users of the group. Graphical user interface 170 also includes controls 176, selection of which enables a user to view tools that are available for engaging in the group study. These tools may include various types of asset information, as described in further detail below. Graphical user interface 170 also includes control 178, selection of which enables a user to view information indicative of other users who are participating in the group study. Graphical user interface 170 also includes control 180, selection of which enables a user to view data associated with the group study. This data may include progress reports of the group, including, e.g., the progress report shown in portion 536 of FIG. 5A.

Figure 2:
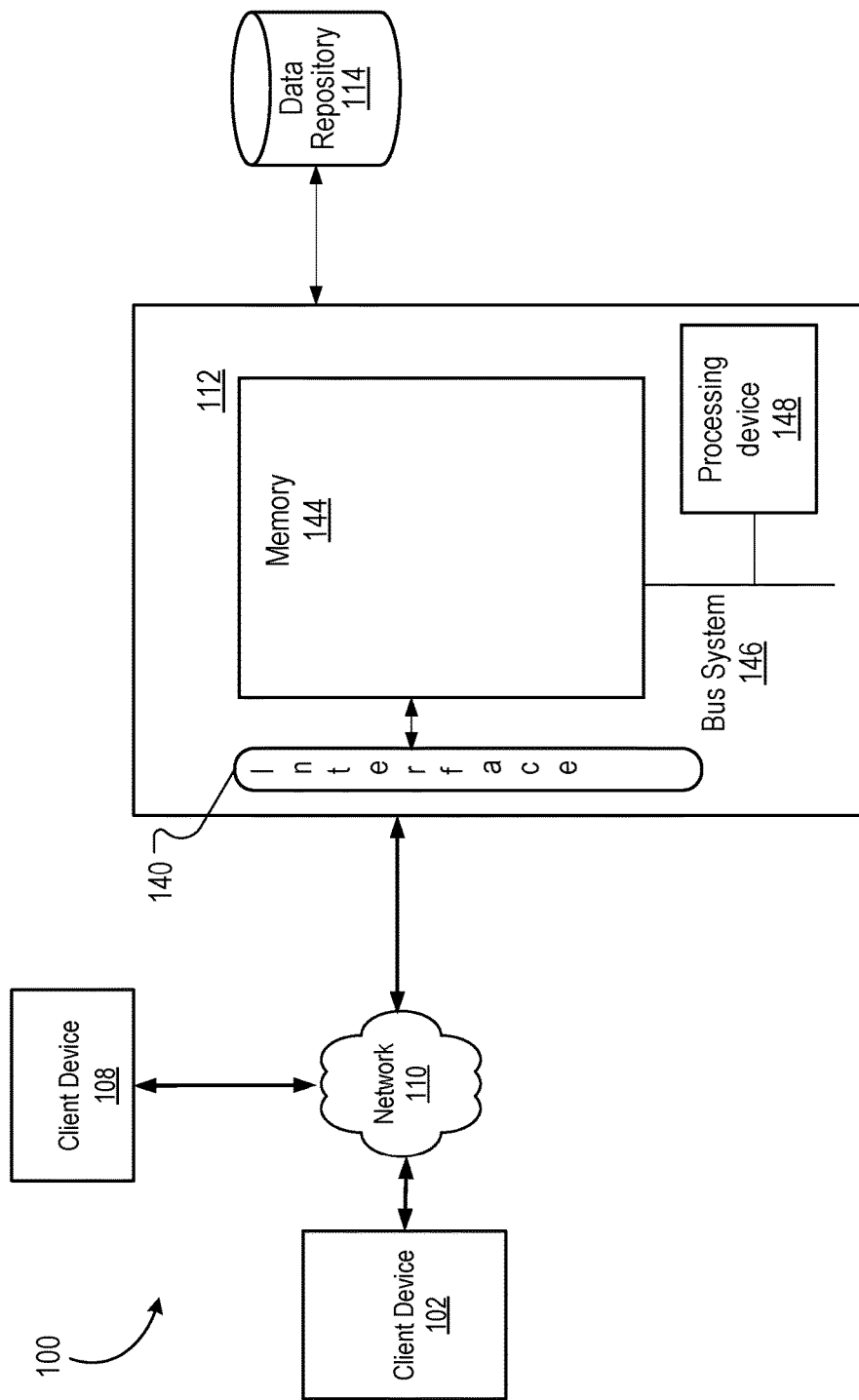
FIG. 2 is a block diagram of components of the PBL system.

FIG. 2 is a block diagram of components of network environment 100. In FIG. 2, client devices 102, 108 can be any sort of computing devices capable of taking input from a user and communicating over network 110 with server 112 and/or with other client devices. For example, client devices 102, 108 can be mobile devices, desktop computers, laptops, cell phones, personal digital assistants ("PDAs"), servers, embedded computing systems, and so forth.

Server 112 can be any of a variety of computing devices capable of receiving data, such as a server, a distributed computing system, a desktop computer, a laptop, a cell phone, a rack-mounted server, and so forth. Server 112 may be a single server or a group of servers that are at a same location or at different locations.

The illustrated server 112 can receive data from client devices 102, 108 via input/output ("I/O") interface 140. I/O interface 140 can be any type of interface capable of receiving data over a network, such as an Ethernet interface, a wireless networking interface, a fiber-optic networking interface, a modem, and so forth. Server 112 also includes a processing device 148 and memory 144. A bus system 146, including, for example, a data bus and a motherboard, can be used to establish and to control data communication between the components of server 112.

The illustrated processing device 148 may include one or more microprocessors. Generally, processing device 148 may include any appropriate processor and/or logic that is capable of receiving and storing data, and of communicating over a network (not shown). Memory 144 can include a hard drive and a random access memory storage device, such as a dynamic random access memory, or other types of non-transitory machine-readable storage devices. Memory 144 stores computer programs (not shown) that are executable by processing device 148 to perform the techniques described herein.

Referring now to FIG. 3A, server 112 generates graphical user interface 300 for display of notes 302. In this example, user 104 reviews solving information 127 (FIG. 1A) and generates notes 302 based on review of solving information 127. In an example, portion 302 displays solving information 127 and user 104 makes notes by marking up portions of solving information 127 as displayed in graphical user interface 300. Graphical user interface 300 includes controls 304, 306, 308, 310, e.g., for editing of solving information 127. In this example, each of controls 304, 306, 308, 310 is a highlighting tool that can be used to highlight portions of text displayed in 302. Each of controls 304, 306, 308, 310 is configured to highlight portions of text in portion 302 in different colors.

Controls 304, 306, 308, 310 may be used to mark various attributes of the solving information, e.g., an attribute indicative of a hypothesis, an attribute indicative of learning objectives, an attribute indicative of a problem list, an attribute indicative of other information, and so forth. In an example, control 304 is used to highlight portions of text as being indicative of a hypothesis, e.g., a hypothesis about a medical problem. Control 306 is used to highlight portions of text as being indicative of a learning objective, e.g., a learning objective of one of the subproblems or the main problem. Control 308 is used to highlight text to indicate a problem list, e.g., information indicative of portions of the solving information that a user does not understand and/or wants to further investigate. Control 310 is used to highlight other information, e.g., information that the user thinks may be useful in solving the problem. In this example, user 104 annotates (e.g., highlights) solving information 127 that is displayed in portion 302 of graphical user interface 300 using one or more of controls 304, 306, 308, 310.

Referring to FIG. 3B, server 112 generates graphical user interface 312 for display of problem solving information 127 that is annotated (e.g., using one or more of controls 304, 306, 308, 310) by user 105. Graphical user interface 312 includes portion 314 for display of solving information 127 that is annotated by user 105 using controls 305, 306, 308, 310.

Referring to FIGS. 3A and 3B, graphical user interface 300 includes annotations 316, 318, 320. Graphical user interface 312 includes annotations 322, 324, each of which may differ from annotations 316, 318, 320. In an example, graphical user interface 300 is displayed on a display of client device 102. In this example, through a web browser, user 104 selects one or more of controls 304, 306, 308, 310. As use 104 selects portions of the solving information 127 displayed in graphical user interface 300, client device 102 transmits, to server 112, information indicative of the selected information (e.g., the annotations). In response, server 112 stores in data repository 114, the information indicative of the selected information.

Figure 3C:
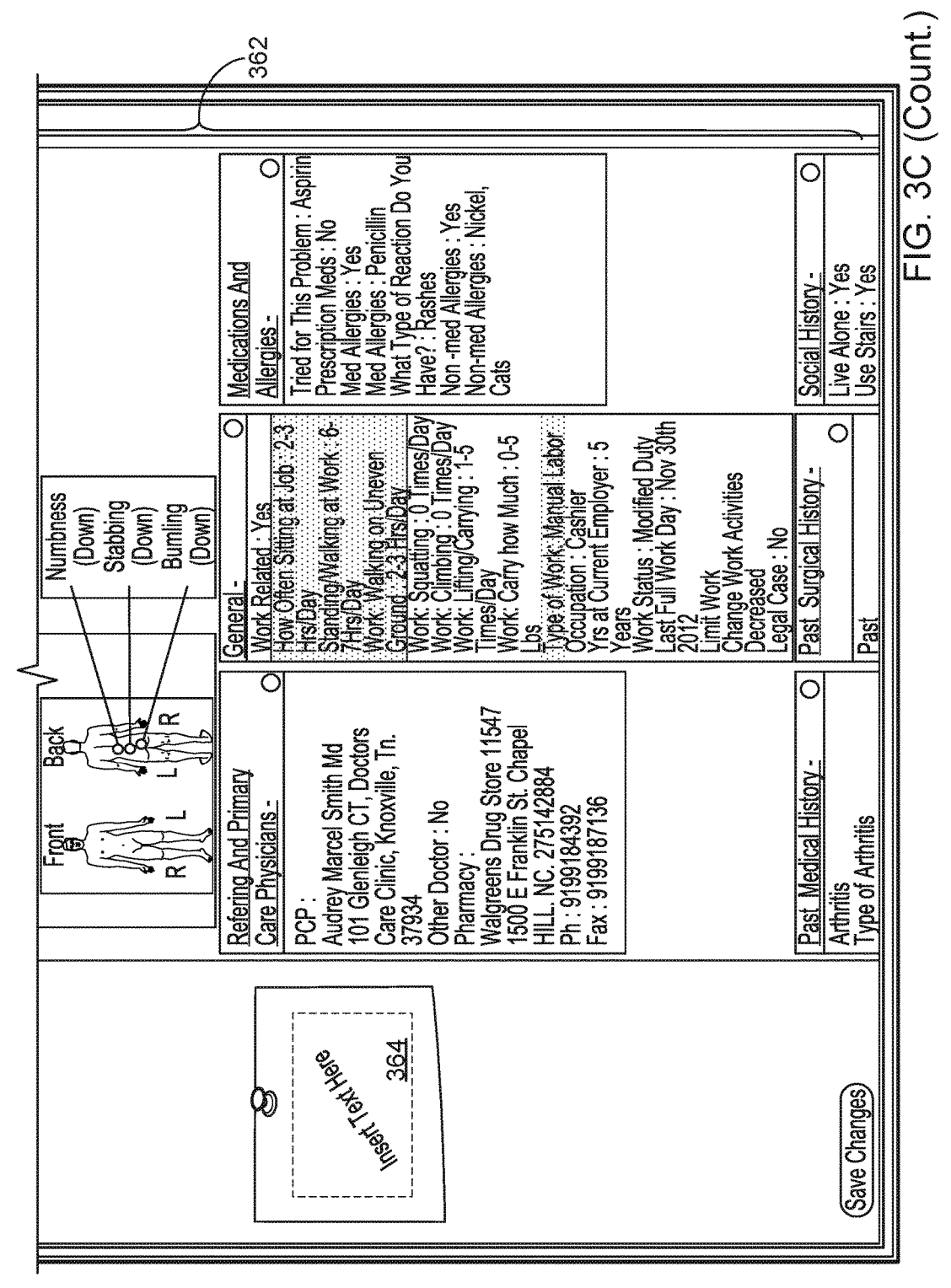

Referring to FIG. 3C, server 112 generates graphical user interface 350 which may be displayed in a private work environment and may be used for the annotation of solving information, including, e.g., solving information 127. In this example, graphical user interface 350 includes portion 360 for display of information pertaining to the patient for which the users are engaging in PBL to diagnose. This displayed information includes referring doctor details, patient details and generate notes.

Graphical user interface 350 includes portion 362 for display of solving information. Graphical user interface 350 also includes annotation controls 352, 354, 356, 358 for marking portions of solving information displayed in portion 362 as pertaining to a hypothesis, an objective, a problem and notes, respectively. Graphical user interface 350 also includes note control 364, e.g., for a user to enter information indicative of a note to be associated with the solving information. In the example of FIG. 3C, a user generates note 366, via note control 364. In this example, note 366 is associated with the solving information displayed in portion 362.

Portion 362 also include anatomy control 370, including, e.g., a visualization of one or more portions of the patient's anatomy. Using anatomy control 370, a user make mark portions of the visualization of the patient's anatomy as experiencing one or more symptoms. In this example, the user uses anatomy control 370 to include in the user's notes information specifying that the patient is experiencing a numbness sensation, a stabbing sensation and a burning sensation. Using anatomy control 370, the user may also specify the portions of the patient's anatomy in which the patient is experiencing these symptoms. The markings and information generated through anatomy control 370 are published to an anonymous work environment, e.g., when the user specifies that he/she wishes to anonymously publish his/her notes and work.

In the example of FIG. 3C, graphical user interface 350 is updated with publish control 368, e.g., upon the user saving changes to annotations and/or notes included in the private work environment. Through publish control 368, a user may select to publish an annotated version of solving information (e.g., includes notes and information generated through anatomy control 370) to an anonymous work environment, e.g., to promote PBL.

Referring to FIG. 4, server 112 generates graphical user interface 400 for display of the annotations of the solving information made by the various users. Graphical user interface 400 includes portion 402 for display of annotations made by user 104. Graphical user interface 400 includes portion 404 for display of annotations made by user 104. Graphical user interface 400 also includes portion 406 for display of annotations made by another user of environment 100. The information displayed in each of portions 402, 404, 406 is arranged by annotation type. There are various annotation types, including, e.g., a hypothesis annotation type, a learning objective annotation type, a problem list annotation type, and other information annotation type. In this example, information that is of the hypothesis annotation type is information that is selected using control 304. Information that is of the learning objectives annotation type is information that is selected using control 306. Information that is of the problem list annotation type is information that is selected using control 308. Information that is of the other information annotation type is information that is selected using control 310.

In the example of FIG. 4, portions 408, 416, 424 display information of the hypothesis annotation type. Portions 410, 418, 426 display information of the learning objectives annotation type. Portions 412, 420, 428 display information of the problem list annotation type. Portions 414, 422, 430 display information of the other information annotation type. The information displayed in graphical user interface 400 is anonymized by server 112, e.g., to enable users 104, 105 and other users to view each other notes and annotations of solving information in a private space.

In an example, user 104 uses control 304 to select a portion of solving information 127 that is displayed in graphical user interface 300. The selected information is of the hypothesis annotation type, as user 104 uses control 304 to select the information. Upon selection of the information, client device 102 sends to server 112 (i) information indicative of the selected information, (ii) information indicative of the control that is used to select the information, (iii) information that uniquely identifies user 104 (e.g., a user name). Upon receipt of the information, server 112 stores in data repository the selected information in association with the information indicative of the control that is used to select the information and in association with the information that uniquely identifies user 104. When generating graphical user interface 400, server 112 generates portions 402, 404, 406 for the various users.

In an example, server 112 populates portion 408, e.g., by determining an annotation type associated with portion 408. In this example, server 112 uses code for generating graphical user interface 400 in determining that portion 408 is for hypothesis annotation information for user 104. In this example, server 112 selects, from data repository 114, a portion of analysis information 146 that was generated using control 304. The portion of analysis information 146 that was generated using control 304 includes portion of solving information 127 that were highlighted using control 304. In this example, analysis information 146 includes information indicative of the highlighted portion of solving information 127. Server 112 also removes identifying information from the portion of analysis information 147 that is to be displayed in portion 408. The identifying information may include, e.g., information specifying a name of user 104, information specifying an affiliated hospital of user 104 and so forth. Server 112 executes similar techniques in populating the other portions (e.g., 410, 412, 414, 416, 418, and so forth) of graphical user interface 400.

In an example, server 112 transmits information indicative of graphical user interface 400 to client devices 102, 108. In this example, client device 102 renders graphical user interface 400. Through graphical user interface 400, user 104 may edit (e.g., annotate) other user's work, e.g., to promote the users reaching a consensus action, e.g., as shown in visual representations 432, 434, 436. Graphical user interface 400 includes a control (not shown) through which user 104 may generate edits 438, 440, 442 (e.g., annotations), e.g., strikethroughs of other user's notes. In still another example, user 104 may enter text into one or more portions of graphical user interface 400, e.g., to indicate additional issues that other users should consider.

In the example of FIG. 4, some of the actions specified in visual representations 432, 434, 436 differ from each other. Based on this mismatch among some of the actions specified in visual representations 432, 434, 436, server 112 determines that the users have not reached a consensus action.

That is, server 112 determines an inconsistency among the recommended action. Because the users have not yet reached a consensus action, server 112 may allow the users additional time to review the solving information. Through the edits (e.g., edits 438, 440, 442) that users make to each other's annotations, the users learn from each other and may modify a hypothesis, a learning objective, and/or a problem list, which in turn may lead to users changing their recommended actions.

Figure 5A:
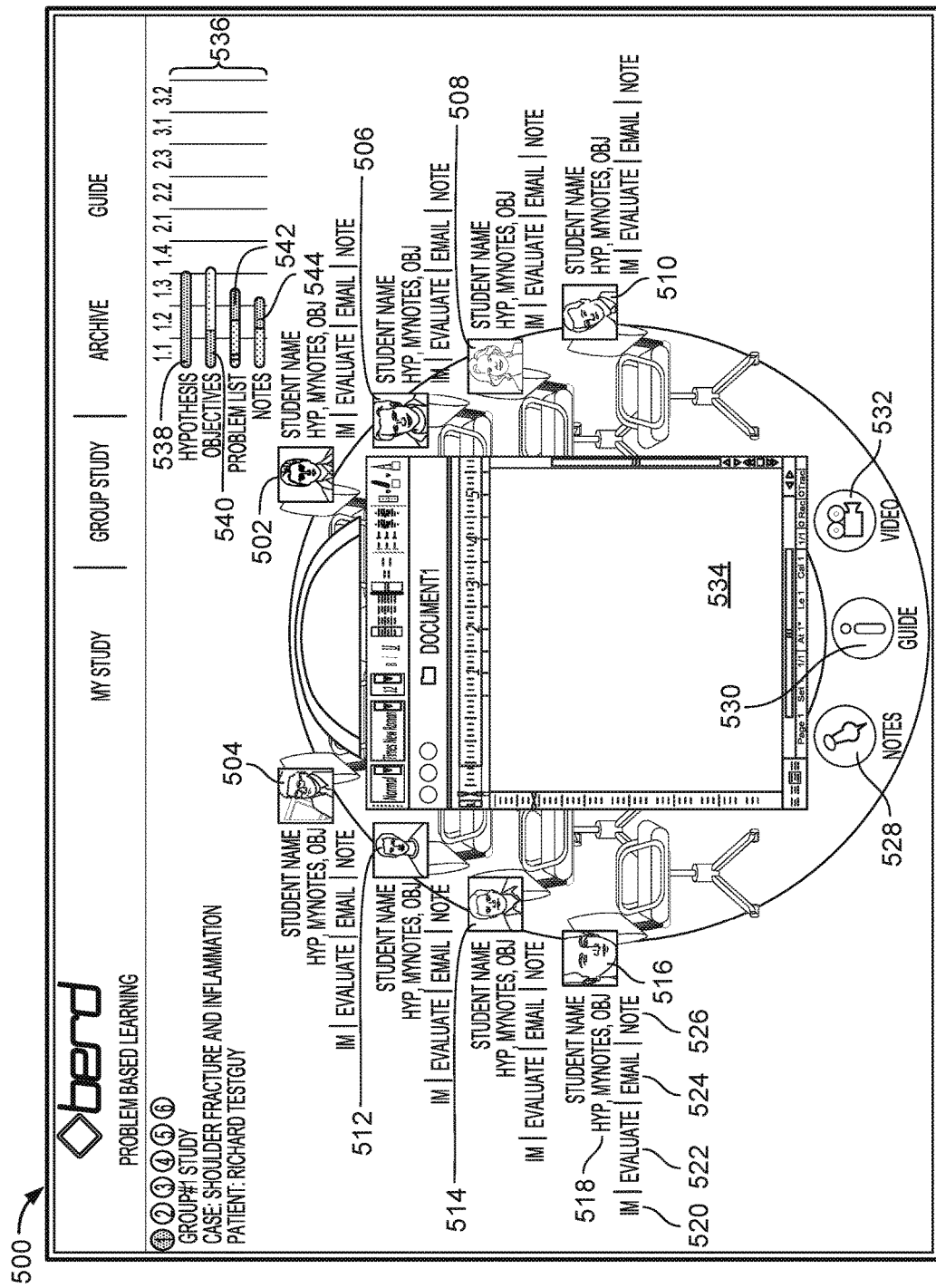

Referring to FIG. 5A, server 112 generates graphical user interface 500 to promote PBL among users of network environment 100. In the example of FIG. 5A, graphical user interface 500 includes visualizations 502, 504, 506, 508, 510, 512, 514, 516 of users of the PBL system (e.g., server 112). A visualization of a user is associated with various information to promote communication among the various users. For example, visualization 516 is associated with selectable portion 518, selection of which causes the analysis information that is generated by the user associated with visualization 516 to be displayed. In an example, this analysis information is displayed in a portion of graphical user interface 400 (FIG. 4). Graphical user interface 500 also includes communication tools 520, 522, 524, 526. Selection of communication control 520 allows a user to send the user represented by visualization 516 an instant message. In an example, the users of the PBL system are evaluated, e.g., by tutors. In this example, the tutors may evaluate the annotation information and/or the analysis information generated by a user, e.g., to promote the user's identification of a correct action. Graphical user interface 500 also includes communication controls 524, 526, e.g., controls for sending a user an email and a note, respectively.

Graphical user interface 500 includes communication controls 528, 530, 532, e.g., to promote communication among multiple users of the PBL system. Upon selection of control 528, graphical user interface 500 displays portion 528, e.g., a visual representation of a note pad. A user (e.g., a tutor or another user of the PBL system) may enter information into portion 528, e.g., to send a note to the other users. Upon selection of control 530, server 112 causes graphical user interface 500 to be updated with a guide, e.g., information that promotes learning that enables the users to reach a consensus action. Upon selection of control 528, graphical user interface 500 is updated to display note portion 534 in which a user may enter information to be shared with the other users.

Graphical user interface 500 also includes chart 536 for display of the users' progress through the various section of the PBL. Chart 536 includes bars 538, 540, 542, 544. Bar 538 provides a visualization of the user's progress of the hypothesis portion of the various sections. Portions of bar 538 are color coded with various colors, e.g., red, yellow and green. A portion of bar 538 is color coded green, e.g., when all the users have correctly identified a hypothesis for a particular section specified by the green color. A portion of bar 538 is color coded yellow, e.g., when a portion of the users have incorrectly identified a hypothesis for a particular section specified by the yellow color. A portion of bar 538 is color coded red, e.g., when a threshold number (or amount) of the users have incorrectly identified a hypothesis for a particular section specified by the yellow color.

Figure 5B:
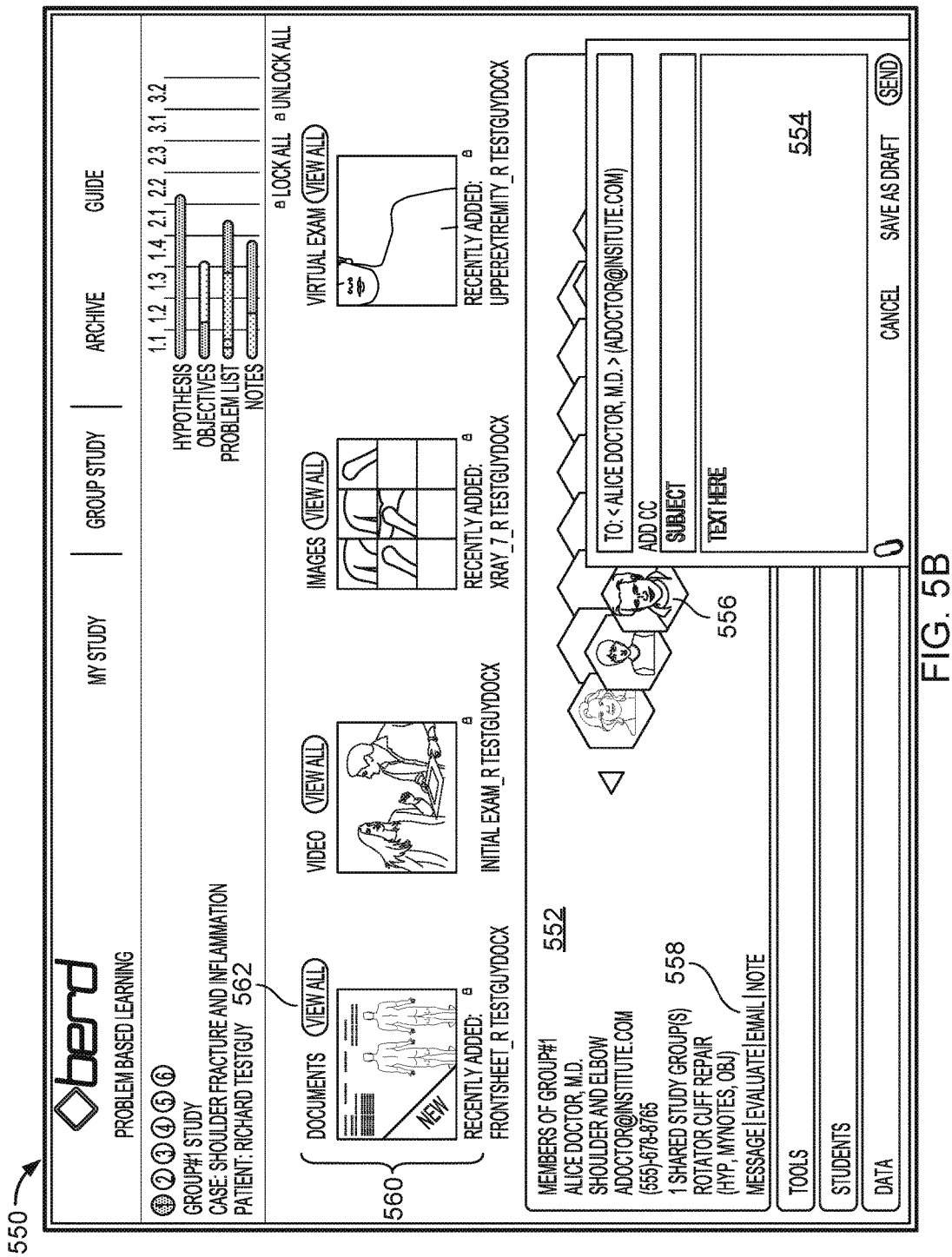

Referring to FIG. 5B, server 112 generates graphical user interface 550 to promote PBL among users of network environment 100. In the example of FIG. 5B, graphical user interface 500 includes portion 552 for display of information indicative of users of the PBL system (e.g., server 112). In this example, a viewer of graphical user interface 550 may view visual representations of one of the members of the group. In the example of FIG. 5B, a user selects visualization 556, e.g., and selects control 558. Upon selection of control 558, the user is presented with communication control 554, e.g., for sending of an e-mail to the user represented in visualization 556. Graphical user interface 550 also includes asset portion 560, e.g., for display of various types of asset information, including, e.g., asset information pertaining to documents, images, video and a virtual examination. In this example, asset portion 562 includes various documents, which may include solving information (e.g., solving information 127).

Figure 6:
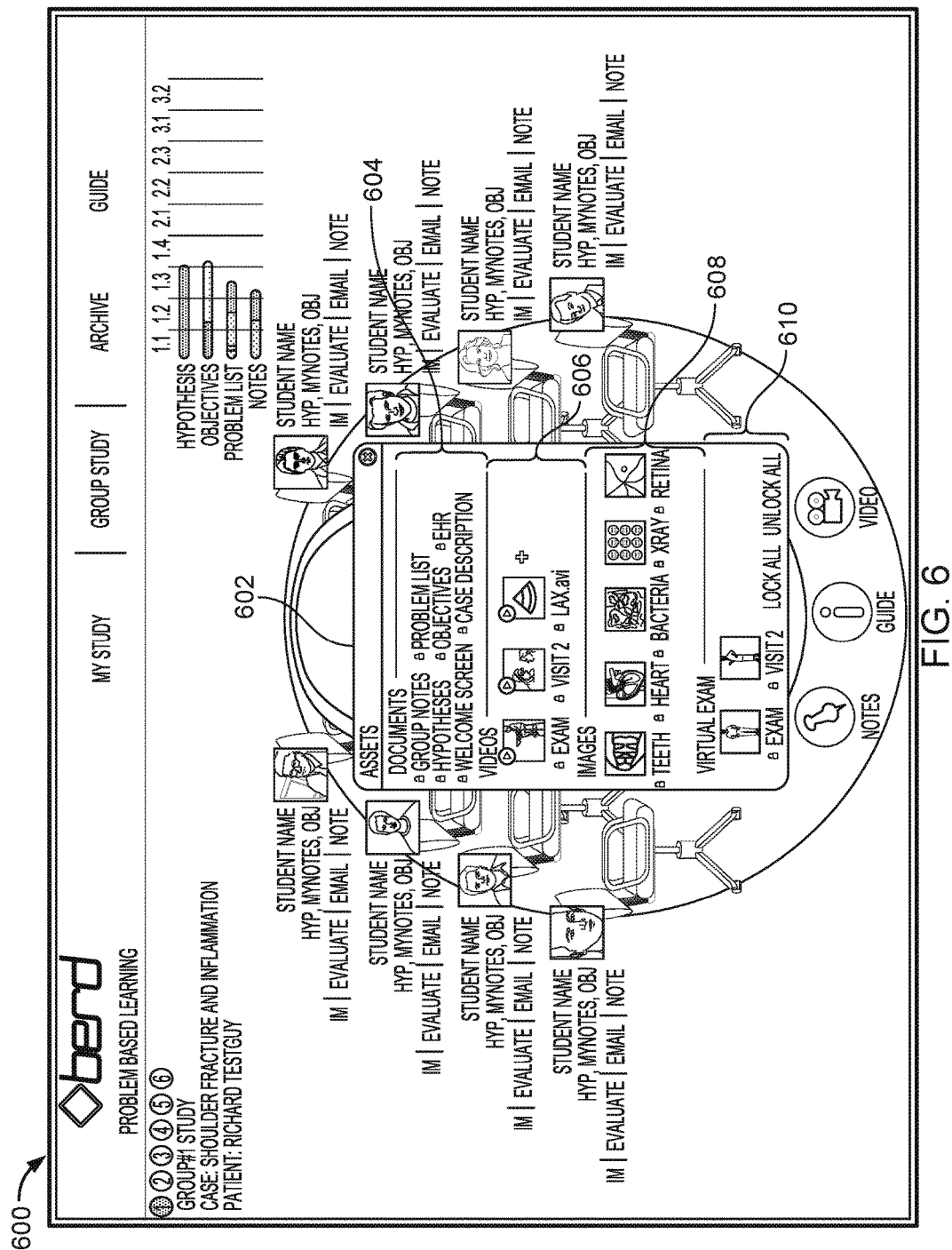

Referring to FIG. 6, server 112 generates graphical user interface 600. In an example, graphical user interface 600 includes graphical user interface 500 that is updated with portion 602. Portion 602 includes a dashboard of information that is available to help students in solving a PBL problem. In an example, the types of information displayed in portion 602 is dependent on a particular section that a group of students are working on. In still another example, the particular items of data that are available in portion 602 are based on a particular section (e.g., section 1.1, section 1.2, etc.) that students are working on completing.

Portion 602 includes asset information 604, video information 606, image information 608, and virtual examination information 610. Asset information 604 includes information indicative of various documents to assist students in solving a PBL problem. These documents include, e.g., group note information, problem list information, hypothesis information, and so forth. Video information 606 includes various videos to assist a user in solving a PBL problem and/or a section of PBL problem. Image information 608 includes various images to assist a user in solving a PBL problem and/or a section of PBL problem. Virtual examination information 610 includes various virtual examinations to assist a user in solving a PBL problem and/or a section of PBL problem. Generally, a virtual examination is an online, simulated examination of a physical examination. In an example, server 112 selects one or more virtual examinations to be included in virtual examination information, based upon the section that the students are working on completing.

Figure 7:
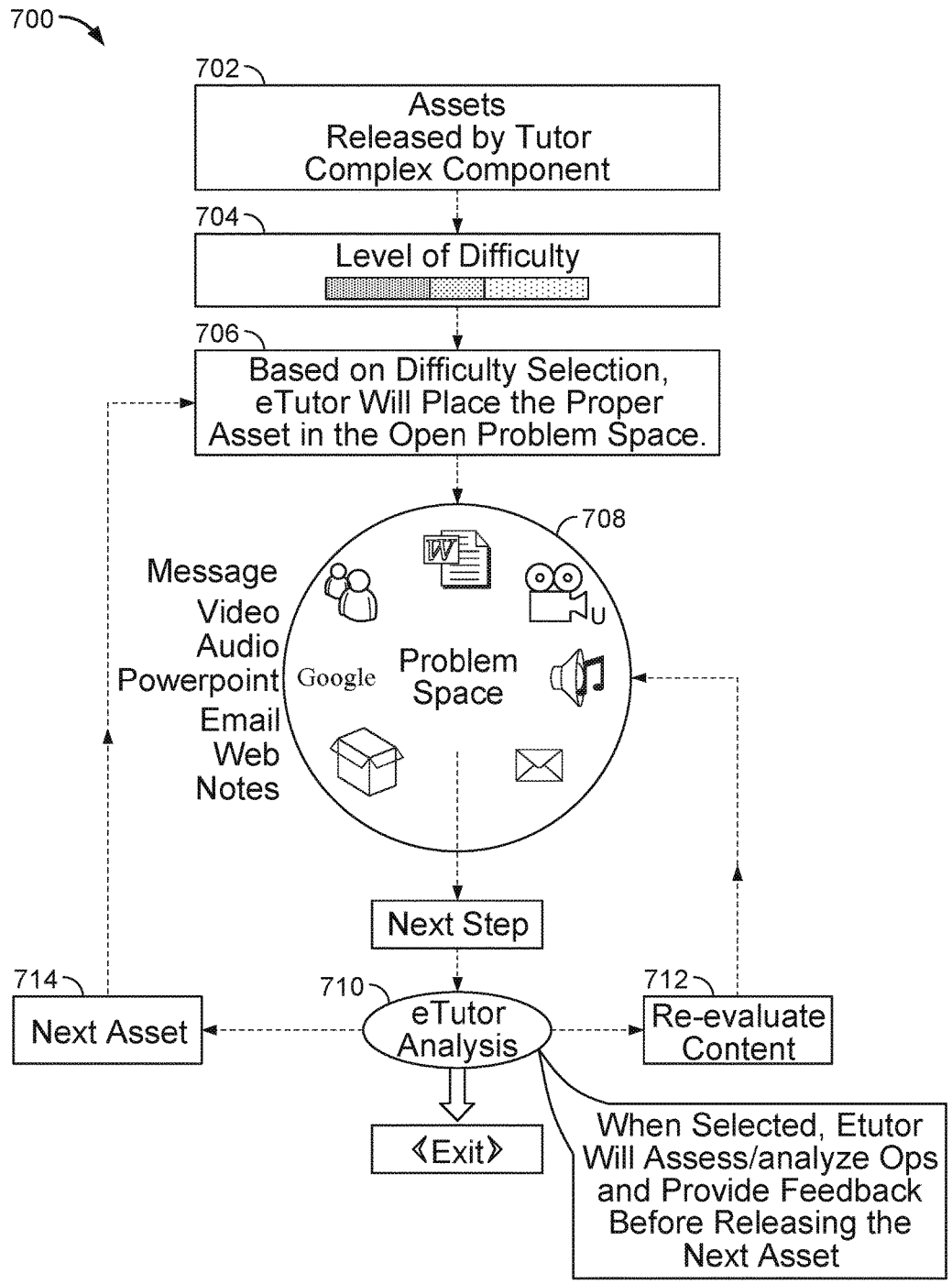
FIGS. 7-9 are flow charts of processes executed by the PBL system.

In an example, a PBL problem is administrator by a tutor. Referring to FIG. 7, server 112 implements process 700 to promote independent learning for a PBL problem. In this example, the learning is independent from an actual human tutor helping and guiding a student through a PBL problem. In this example, server 112 implements an electronic tutor (eTutor) module that automatically provides guidance to assist the students in learning, e.g., by gradually releasing assets that promote identification of various information that is pertinent to a particular section.

In operation, server 112 receives (702), from a client device used by a tutor, a selection of various asset information to assist the students in solving a PBL problem. As previously described, the asset information includes various solving information, video information, and so forth. Server 112 also receives (704), from the client device used by the tutor, information indicative of a requested level of difficulty, e.g., an amount of difficulty a student experiences in solving the PBL learning problem. In this example, server 112 selects (706) one or more assets (e.g., an item of asset information) to display in a work space (e.g., portion 602 of graphical user interface 600) to promote the solving of a PBL problem. In this example, various assets are associated with various difficulty levels. In this example, server 112 selects, for a particular section, one or more assets for display to the students based on the selected level of difficulty and assets that are appropriate for a section.

In the example of FIG. 7, server 112 enables a user to access one or more of the identified assets of the appropriate difficulty level. The assets are shown as research tools 708, e.g., and promote a user's ability to access external resources to research and hence solve a PBL problem. As shown in FIG. 7, these assets may include word processing documents, a web browser, online web searching, instant messaging tools, and so forth. Using the identified assets and solving information (as shown in FIG. 1A), a user generates analysis information, e.g., by selecting a hypothesis, learning objectives, problem list, recommended action and so forth. Server 112 performs (710) an electronic tutor (eTutor) analysis operation on the received analysis information. In an eTutor analysis operation, server 112 analyzes a user's analysis information, e.g., to determine is the user is correctly identifying a hypothesis, a learning objective, a problem list and/or a recommended action for a particular section. In an example, server 112 determines that the user has not determined a threshold amount of information, e.g., the user has not correctly identified one or more of the hypothesis, the learning objective, the problem list and/or the recommended action for a particular section. In this example, server 112 generates (712) a notification message that notifies the user to re-evaluate the content. In another example, the eTutor analysis component of server 112 generates feedback information (not shown), including, e.g., information to assist a user (e.g., a student) in correctly identifying issues (e.g., a hypothesis, recommended action, etc.) and aspects of the solving information. In some examples the feedback information may include information that instructs a user to review a particular image, a particular video and/or a particular virtual examination. In other examples, the feedback information includes instructions for a student to review a particular medical article or to pay particular attention to a particular aspect of the solving information. The feedback information may also include instructions to consult with a human tutor and/or to consult with a particular student in the group. In still another example, the feedback information includes hints to promote solving of the PBL problem and/or of the subproblems in the various sections.

In still another example, server 112 determines that the user has determined a threshold amount of information, e.g., the user has correctly identified one or more of the hypothesis, the learning objective, the problem list and/or the recommended action for a particular section. In this example, server 112 enables (714) the user to view another asset for the particular section, e.g., to enable the user to correctly identify even more of the hypothesis, the learning objective, the problem list and/or the recommended action for a particular section. For example, perhaps the user has correctly identified a learning objective, but has not yet correctly identified a hypothesis. In this example, correct identification of a threshold amount of information includes correct identification of one or more of the hypothesis, the learning objective, the problem list and/or the recommended action for a particular section at action 710. Due to the user's correct identification of the learning objective, the user has identified a threshold amount of information, as determined in action 710. Based on this determination, server 112 reveals an additional asset (e.g., at action 714) to promote the user's successful identification of other information, e.g., a recommendation action, a hypothesis, and so forth.

In an example, server 112 repeats actions 706, 710, 712, 714, e.g., until a user has correctly identified all information (e.g., recommendation action, hypothesis, and so forth) for a particular section and/or until the users in a group have reached a consensus action, causing the group to progress to a new section, in which process 700 may be repeated for that new section.

Figure 8:
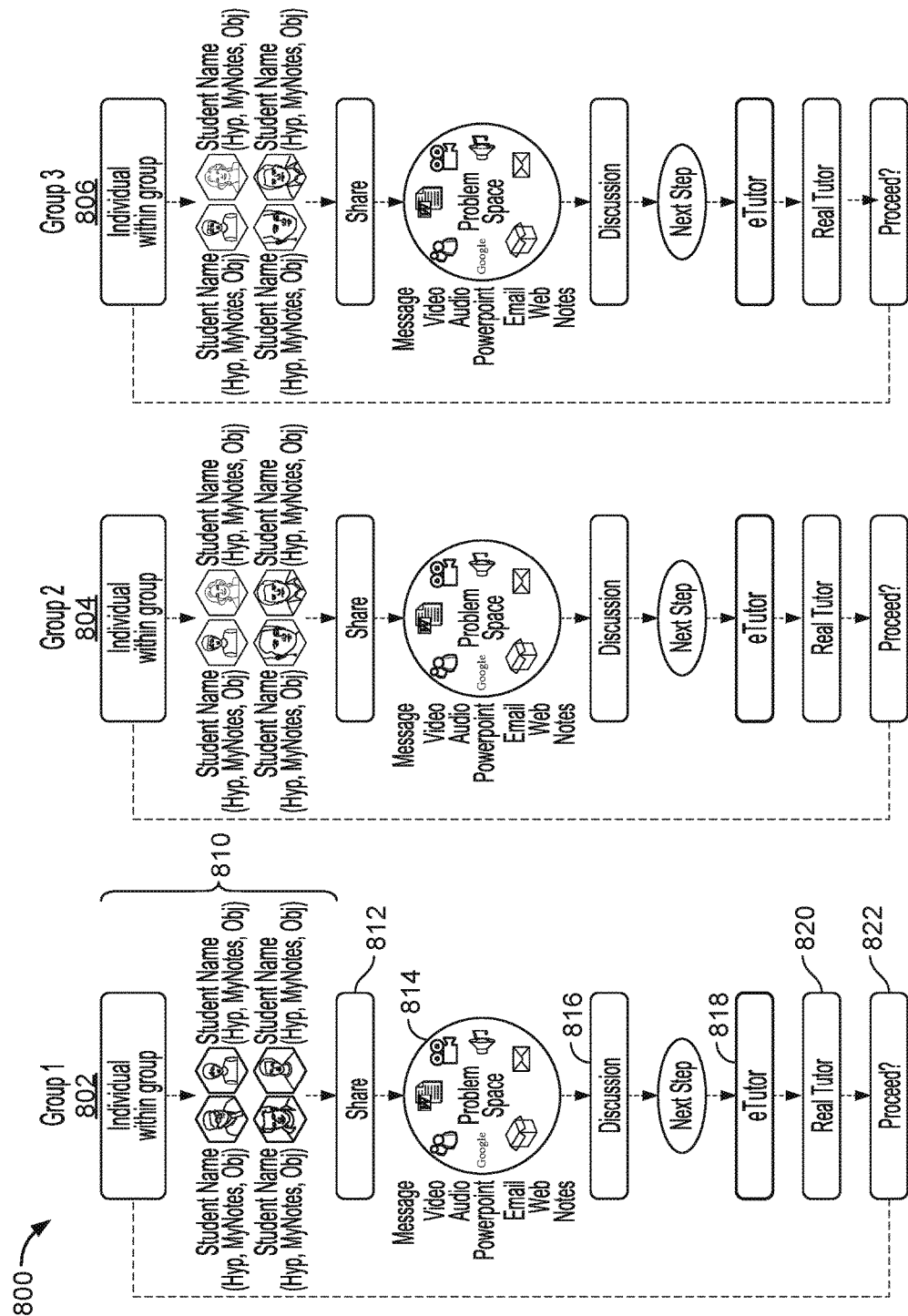

Referring to FIG. 8, server 112 implements process 800 in executing, in parallel, eTutor learning operations 802, 804, 806 for various different groups (e.g., groups 1-4). Each of eTutor learning operations 802, 804, 806 execute similar operations. For purposes of convenience, and without limitation, the operations included in eTutor learning operation 802 are described. eTutor learning operation 802 includes portion 810, in which individual users within a group review assets (for a particular information), review solving information and generate—based on the presented solving information and on the revealed asset—analysis information. In this example, a user uses a client device to send to server 112 an instruction to share the generated analysis information with other users in the group. In action 812, server 112 shares with users' analysis information with other users in the group. In an example, server 112 may share the analysis information through graphical user interface 400 (FIG. 4). As shown in FIG. 8, server 112 may provide users with various tools 814 through which users may view other users analysis information (e.g., in an anonymized format), e.g., a web browser for viewing a graphical user interface with anonymized analysis information, a word processing document for viewing the anonymized analysis information, and so forth. In this example, the users may engage in a discussion (as shown in action 816) regarding other users' analysis information. Referring back to FIG. 4, users may engage in a discussion by editing other users' annotations. Referring to FIG. 8, the users may use one or more of the tools depicted in tools 814, e.g., to engage in a discussion. For example, the users may use an instant messaging tool to discuss each other's analysis information. Based on the discussion, the users may modify their analysis information, e.g., update a recommended action and/or a hypothesis.

In action 818, the eTutor component of server 112 analyzes the modified analysis information, e.g., updates that users have made to original analysis information. If the eTutor component determines that a threshold amount of information is correctly determined, the eTutor component releases another asset for the users to view, as previously described. In this example, if the eTutor component determines that a threshold amount of information is not correctly determined, the eTutor component may execute action 820 in which server 112 notifies a human tutor of a need to assist one or more of the users in the group, e.g., depending on the severity of the amount of incorrect information. In this example, if the number of incorrectly determined items exceeds a predetermined number, then the server 112 determines that the amount of incorrectly identified information is severe enough to warrant notifying a real-human tutor. However, in another example, if the number of incorrectly determined items fails to exceed a predetermined number (i.e., that is indicative of the severity of the amount of difficulty the user is experiencing in correctly identifying information), then the server 112 may prompt the user to re-evaluate the content, e.g., to promote the user correctly identifying the information.

In this example, server 112 may enable a device used by a human tutor to become connected (e.g., via an IM chat, a video conference, and so forth) to a device used by a user who is experiencing problems correctly identifying information that is pertinent to the solving of the PBL problem. In this example, the user consults with the human tutor.

Based on the consultation, the user may update the user's analysis information, e.g., by updating a hypothesis, a recommended action, and so forth. At action 822, server 112 determines whether a user may proceed to a next section and/or proceed to view another asset that is revealed to the user. Server 112 determines whether the user may proceed by determining whether the user has correctly identified the threshold amount of information. If the user has correctly identified the threshold amount of information, the server 112 enables the user to proceed, e.g., by revealing another asset, by enabling the user to transition to another section and so forth.

As shown in FIG. 8, through process 802, server 112 may leverage a real human tutor across multiple groups that are working on solving a PBL problem. In this example, through the eTutor component, server 112 is configured to analyze and determine when a real human tutor is required to assist students in solving the PBL problem.

Figure 9:
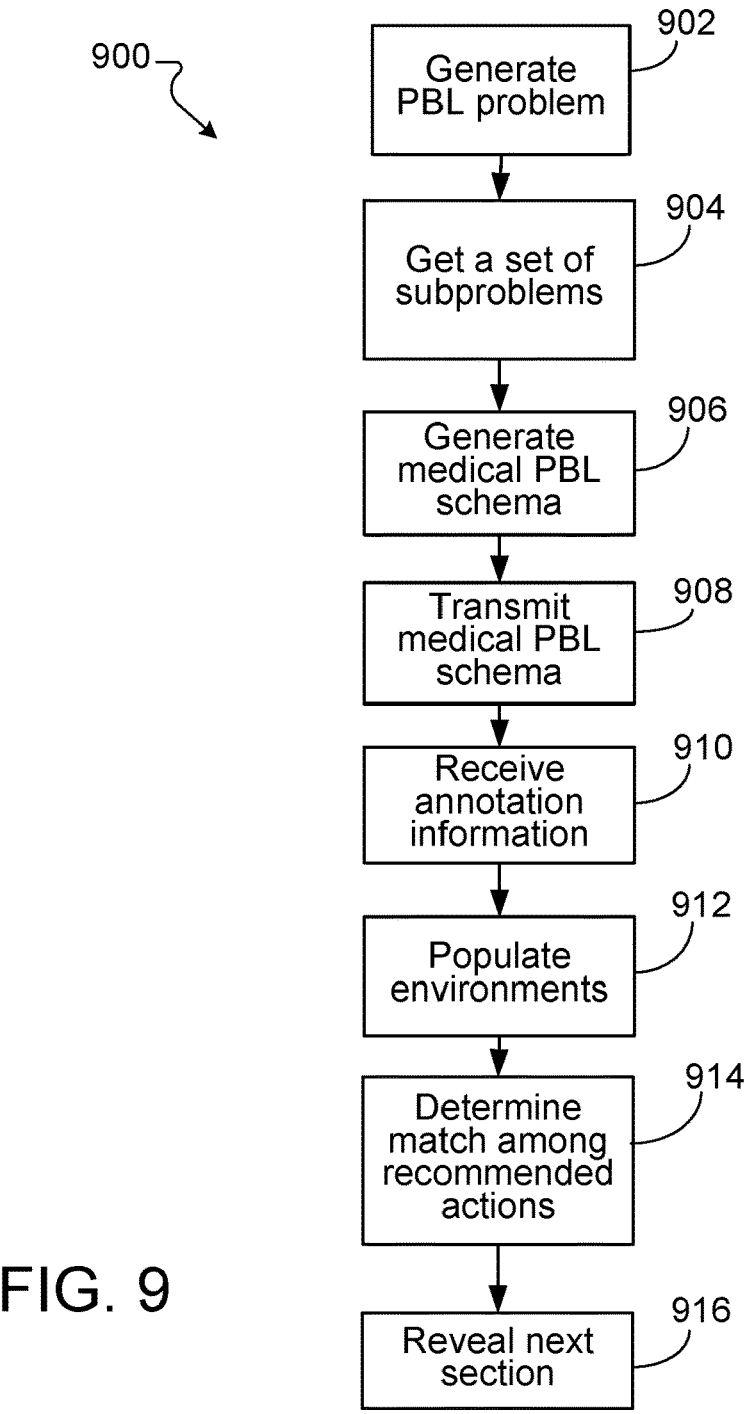

Referring to FIG. 9, server 112 implements process 900 in transitioning users among the various sections in a PBL schema. In operation, server 112 generates (902) a PBL problem to be solved by a group of students using the virtual PBL system (e.g., server 112). The PBL may include, for example, medical problem information 150. Server 112 also generates (904) a set of sub-problems that promote solving of the PBL problem. Server 112 generates (906) a medical PBL schema that promotes solving of the PBL problem, with the medical PBL schema comprising a plurality of sections, with one or more of the sections promoting solving of the sub-problems, and with one of the sections for solving of the PBL problem, with each section associated with (i) a private work environment for a particular student to privately analyze the medical problem, (ii) a shared, anonymous work environment for the students in the group to view analysis performed by other students in solving the medical problem, and (iii) solving information to promote solving of a problem for the section.

In the example of FIG. 9, server 112 transmits (908), to one or more client systems used by the students participating in the virtual PBL system, the medical PBL schema. In this example, for a particular section of the medical PBL schema, server 112 receives (910), from a client device used by the particular student, annotation information indicative of one or more attributes of the solving information for the section. In response, server 112 populates (912) private and anonymous work environments. In particular, server 112 populates the private work environment of the particular student with the annotation information. Server 112 also populates the shared, anonymous work environment with an anonymized version of the annotated solving information. In this example, server 112 receives (not shown), from client devices used by other of the students, information indicative of edits to the anonymized version of the annotated solving information of the particular student. Server 112 also presents (not shown), to the client device used by the particular student submitting the annotation information, the information indicative of the edits. In response to presentation of the edits, server 112 receives, from the client device used by the particular student information, indicative of a recommended action for the section. Server 112 also compares the received recommended action to other recommended actions submitted by other students and determines (914) a match among the recommended actions. In response to determination of the match, server reveals (916) a subsequent section in the medical PBL schema, e.g., by enabling the medical PBL schema to transition from the current section to a subsequent section in the medical PBL schema.

Embodiments can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be data in different formats such as text, graphics, images, sound, video, Hypertext Markup Language (HTML), as well as programs. Upon specification of a link by the user, the client computer makes a TCP/IP request to a Web server and receives data, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view data available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations.

The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the invention.

What is claimed is:

1. A computer-implemented method, comprising:
   selecting, by a virtual problem-based learning (PBL) system, information indicative of a medical profile of a patient;
   accessing, by the virtual PBL system, information indicative of a team of users using the virtual PBL system;
   generating, by the virtual PBL system and based on the medical profile, a first instance of a medical PBL schema related to a medical problem to be solved by the team of users, wherein generating the first instance of the medical PBL schema comprises:
   generating a plurality of sections of the first instance of the medical PBL schema that each include a plurality of working environments that each have different levels of shared access to the working environment; the plurality of working environments comprising:
   (i) a private work environment configured for rendering on a browser on a first user device and that is further configured to receive information that is related to the medical problem from the first user device or output information that is related to the medical problem for rendering on a rendering device of the first user device, wherein the private work environment is inaccessible to at least a second user device, and
   (ii) a shared, anonymous work environment configured for rendering on a browser on the first user device and that is further configured to output information related to the medical problem on the first user device, wherein the output information related to the medical problem rendered in the anonymous work environment is also accessible to at least the first user device and the second user device;
   accessing, from a memory storage device, a first data structure storing first data representing the medical problem and further storing a unique identifier, with the first data being retrieved from the first user device through the private work environment and input into the memory storage device;
   accessing, from the memory storage device, a second data structure storing second data representing the medical problem and further storing the unique identifier, with the second data retrieved from the second user device through a different private work environment of a second instance of the medical PBL schema and input into the memory storage device;
   correlating, in accordance with the unique identifier stored in each of the first and second data structures, the first data received from the first user device with the second data received from the second user device by correlating the first data structure accessed from the memory storage device and with the second data structure accessed from the memory storage device;
   generating, by the virtual PBL system, rendering data for an anonymous display of the correlated data in the correlated data structures for output in (i) a visual representation of the anonymous work environment of the first instance of the medical PBL schema and (ii) a visual representation of an anonymous work environment of the second instance of the medical PBL schema; and
   transmitting, by the virtual PBL system, the rendering data for the anonymous display of the correlated data of the correlated data structures, with the rendering data, (i) when rendered on a rendering device of the first user device, rendering the visual representation of the anonymous work environment of the first instance of the medical PBL schema, and (ii) when rendered on a rendering device of the second user device, rendering the visual representation of the anonymous work environment of the second instance of the medical PBL scheme.

2. The computer-implemented method of claim 1, further comprising:
   evaluating the first data stored in the first data structure of the memory storage device;
   generating, based on the evaluating, feedback information; and
   transmitting the feedback information to at least one of the first user device or the second user device.

3. The computer-implemented method of claim 1, further comprising:
associating one or more research tools with the private work environment, wherein the one or more research tools are selected from a group consisting of an Internet browser and an instant messaging tool.

4. The computer-implemented method of claim 1, further comprising:
transmitting, to at least one of the first user device or the second user device, outcome data indicative of outcomes of patients with medical profiles that are similar to the selected medical profile, with the outcome data comprising comorbidity data.

5. The computer-implemented method of claim 1, further comprising:
receiving, from the first user device, information indicative of an annotation of information displayed in an anonymous work environment of the first instance of the medical PBL scheme; and
updating the anonymous work environment of the second instance of the medical PBL schema with the received annotation.

6. The computer-implemented method of claim 1, further comprising:
for a particular first section:
determining, from the first data representing the medical problem and the second data representing the medical problem, first recommended actions that are recommended by a first user of the first device and the second user of the second device;
determining an inconsistency among the first recommended actions;
providing, to the first user device or the second user device, evaluation information to promote an understanding by the first user or the second user of the medical problem;
receiving, from the first user device or the second user device, second analysis information indicative of another analysis performed by the first user or the second user;
determining, from the received second analysis information, one or more second recommended actions that are recommended by the first user and the second user;
determining consistency among the one or more second recommended actions;
causing, based on determination of the consistency, the medical PBL schema to progress from the first section to a second section.

7. The computer-implemented method of claim 1, further comprising:
retrieving information indicative of a correct action for the particular first section;
responsive to determining the consistency among the second recommended actions,
generating a notification of whether the second recommended actions corresponds to the correct action.

8. The computer-implemented method of claim 7, wherein the second recommended actions comprise an action to perform surgery.

9. The computer-implemented method of claim 1, further comprising:
generating highlighting tools for annotation of the medical profile, wherein each one of the highlighting tools corresponds to attributes of the medical problem;
receiving, by the computer system, information indicative of annotations of the medical profile;
determining, by the computer system, at least a portion of the annotations that is selected using a particular one of the highlighting tools;
identifying which one of the attributes corresponds to the particular one of the highlighting tools; and
storing, in a data repository, the determined portion of the annotations in association with the identified one of the attributes.

10. The computer-implemented method of claim 1, the method further comprising:
determining that the first user has correctly determined more than a threshold amount of information associated with a first set of one or more assets associated with the medical problem; and
in response to determining that the first user has correctly determined more than the threshold amount of information associated with the first set of one or more assets associated with the medical problem, enabling, by a server hosting the virtual PBL system and for the first user, access to a second set of one or more assets associated with the medical problem.

11. A system comprising:
one or more processing devices; and
one or more computer-readable media storing instructions that are executable by the one or more processing devices to perform operations comprising:
selecting information indicative of a medical profile of a patient;
accessing information indicative of a team of users using the virtual PBL system;
generating, based on the medical profile, a first instance of a medical PBL schema related to a medical problem to be solved by the team of users, wherein generating the first instance of the medical PBL schema comprises;
generating a plurality of sections of the first instance of the medical PBL schema that each include a plurality of working environments that each have different levels of shared access to the working environment, the plurality of working environments comprising:
(i) a private work environment configured for rendering on a browser on a first user device and that is further configured to receive information that is related to the medical problem from the first user device or output information that is related to the medical problem for rendering on a rendering device of the first user device, wherein the private work environment is inaccessible to at least a second user device, and
(ii) a shared, anonymous work environment configured for rendering on a browser on the first user device and that is further configured to output information related to the medical problem on the first user device, wherein the output information related to the medical problem rendered in the anonymous work environment is also accessible to at least the first user device and the second user device;
accessing, from a memory storage device, a first data structure storing first data representing the medical problem and further storing a unique identifier, with the first data being retrieved from the first user device through the private work environment and input into the memory storage device;
accessing, from the memory storage device, a second data structure storing second data representing the medical problem and further storing the unique identifier, with the second data retrieved from the second user device through a different private work environment of a second instance of the medical PBL schema and input into the memory storage device;

correlating, in accordance with the unique identifier stored in each of the first and second data structures, the first data received from the first user device with the second data received from the second user device by correlating the first data structure accessed from the memory storage device and with the second data structure accessed from the memory storage device;

generating, by the virtual PBL system, rendering data for an anonymous display of the correlated data in the correlated data structures for output in (i) a visual representation of the anonymous work environment of the first instance of the medical PBL schema and (ii) a visual representation of an anonymous work environment of the second instance of the medical PBL schema; and transmitting, by the virtual PBL system, the rendering data for the anonymous display of the correlated data of the correlated data structures, with the rendering data, (i) when rendered on a rendering device of the first user device, rendering the visual representation of the anonymous work environment of the first instance of the medical PBL schema, and (ii) when rendered on a rendering device of the second user device, rendering the visual representation of the anonymous work environment of the second instance of the medical PBL schema.

12. The system of claim 10, wherein the operations further comprise:
evaluating the first data stored in the first data structure of the memory storage device;
generating, based on the evaluating, feedback information; and
transmitting the feedback information to at least one of the first user device or the second user device.

13. The system of claim 11, wherein the operations further comprise:
for a particular first section:
determining, from the first data representing the medical problem and the second data representing the medical problem, first recommended actions that are recommended by a first user of the first device and the second user of the second device;
determining an inconsistency among the first recommended actions;
providing, to the first user device or the second user device, evaluation information to promote an understanding by the first user or the second user of the medical problem;
receiving, from the first user device or the second user device, second analysis information indicative of another analysis performed by the first user or the second user;
determining, from the received second analysis information, one or more second recommended actions that are recommended by the first user and the second user;
determining consistency among the one or more second recommended actions;
causing, based on determination of the consistency, the medical PBL schema to progress from the first section to a second section.

14. The system of claim 13, the operations further comprise:
retrieving information indicative of a correct action for the particular first section; and responsive to determining the consistency among the second recommended actions,
generating a notification of whether the second recommended actions corresponds to the correct action.

15. The system of claim 13, wherein the second recommended actions comprise an action to perform surgery.

16. The system of claim 11, the operations further comprising:
transmitting, to at least one of the first user device or the second user device, outcome data indicative of outcomes of patients with medical profiles that are similar to the selected medical profile, with the outcome data comprising comorbidity data.

17. The system of claim 11, the operations further comprising:
receiving, from the first user device, information indicative of an annotation of information displayed in an anonymous work environment of the first instance of the medical PBL schema; and
updating the anonymous work environment of the second instance of the medical PBL schema with the received annotation.

18. The system of claim 11, the operations further comprising:
generating highlighting tools for annotation of the medical profile, wherein each one of the highlighting tools corresponds to attributes of the medical problem;
receiving, by the computer system, information indicative of annotations of the medical profile;
determining, by the computer system, at least a portion of the annotations that is selected using a particular one of the highlighting tools;
identifying which one of the attributes corresponds to the particular one of the highlighting tools; and
storing, in a data repository, the determined portion of the annotations in association with the identified one of the attributes.

19. The system of claim 11, the operations further comprising:
determining that the first user has correctly determined more than a threshold amount of information associated with a first set of one or more assets associated with the medical problem; and
in response to determining that the first user has correctly determined more than the threshold amount of information associated with the first set of one or more assets associated with the medical problem, enabling, by a server hosting the virtual PBL system and for the first user, access to a second set of one or more assets associated with the medical problem.

20. A computer-readable storage device having stored thereon instructions, which, when executed by data processing apparatus, cause the data processing apparatus to perform operations comprising:
selecting, by a virtual problem-based learning (PBL) system, information indicative of a medical profile of a patient;
accessing, by the virtual PBL system, information indicative of a team of users using the virtual PBL system;
generating, by the virtual PBL system and based on the medical profile, a first instance of a medical PBL schema related to a medical problem to be solved by the team of users, wherein generating the first instance of the medical PBL schema comprises;
generating a plurality of sections of the first instance of the medical PBL schema, that each include a plurality of working environments that each have different levels of shared access to the working environment, the plurality of working environments comprising:
(i) a private work environment configured for rendering on a browser on a first user device and that is further configured to receive information that is related to the medical problem from the first user device or output information that is related to the medical problem for rendering on a rendering device of the first user device, wherein the private work environment is inaccessible to at least a second user device, and
(ii) a shared, anonymous work environment configured for rendering on a browser on the first user device and that is further configured to output information related to the medical problem on the first user device, wherein the output information related to the medical problem rendered in the anonymous work environment is also accessible to at least the first user device and the second user device;
accessing, from a memory storage device, a first data structure storing first data representing the medical problem and further storing a unique identifier, with the first data being retrieved from the first user device through the private work environment and input into the memory storage device;
accessing, from the memory storage device, a second data structure storing second data representing the medical problem and further storing the unique identifier, with the second data retrieved from the second user device through a different private work environment of a second instance of the medical PBL schema and input into the memory storage device;
correlating, in accordance with the unique identifier stored in each of the first and second data structures, the first data received from the first user device with the second data received from the second user device by correlating the first data structure accessed from the memory storage device and with the second data structure accessed from the memory storage device;
generating, by the virtual PBL system, rendering data for an anonymous display of the correlated data in the correlated data structures for output in (i) a visual representation of the anonymous work environment of the first instance of the medical PBL schema and (ii) a visual representation of an anonymous work environment of the second instance of the medical PBL schema; and
transmitting, by the virtual PBL system, the rendering data for the anonymous display of the correlated data of the correlated data structures, with the rendering data, (i) when rendered on a rendering device of the first user device, rendering the visual representation of the anonymous work environment of the first instance of the medical PBL schema, and (ii) when rendered on a rendering device of the second user device, rendering the visual representation of the anonymous work environment of the second instance of the medical PBL schema.

21. The computer-readable storage device of claim 20, the operations further comprising:
evaluating the first data stored in the first data structure of the memory storage device;
generating, based on the evaluating, feedback information; and
transmitting the feedback information to at least one of the first user device or the second user device.

22. The computer-readable storage device of claim 20, the operations further comprising:
associating one or more research tools with the private work environment, wherein the one or more research tools are selected from a group consisting of an Internet browser and an instant messaging tool.

23. The computer-readable storage device of claim 20, the operations further comprising:
transmitting, to at least one of the first user device or the second user device, outcome data indicative of outcomes of patients with medical profiles that are similar to the selected medical profile, with the outcome data comprising comorbidity data.

24. The computer-readable storage device of claim 20, the operations further comprising:
receiving, from the first user device, information indicative of an annotation of information displayed in an anonymous work environment of the first instance of the medical PBL schema; and
updating the anonymous work environment of the second instance of the medical PBL schema with the received annotation.

25. The computer-readable storage device of claim 20, the operations further comprising:
for a particular first section:
determining, from the first data representing the medical problem and the second data representing the medical problem, first recommended actions that are recommended by a first user of the first device and the second user of the second device;
determining an inconsistency among the first recommended actions;
providing, to the first user device or the second user device, evaluation information to promote an understanding by the first user or the second user of the medical problem;
receiving, from the first user device or the second user device, second analysis information indicative of another analysis performed by the first user or the second user;
determining, from the received second analysis information, one or more second recommended actions that are recommended by the first user and the second user;
determining consistency among the one or more second recommended actions;
causing, based on determination of the consistency, the medical PBL schema to progress from the first section to a second section.

26. The computer-readable storage device of claim 20, the operations further comprising:
retrieving information indicative of a correct action for the particular first section;
responsive to determining the consistency among the second recommended actions,
generating a notification of whether the second recommended actions corresponds to the correct action.

27. The computer-readable storage device of claim 26, wherein the second recommended actions comprise an action to perform surgery.

28. The computer-readable storage device of claim 20, the operations further comprising:
generating highlighting tools for annotation of the medical profile, wherein each one of the highlighting tools corresponds to attributes of the medical problem;
receiving, by the computer system, information indicative of annotations of the medical profile;
determining, by the computer system, at least a portion of the annotations that is selected using a particular one of the highlighting tools;

identifying which one of the attributes corresponds to the particular one of the highlighting tools; and storing, in a data repository, the determined portion of the annotations in association with the identified one of the attributes.

29. The computer-readable storage device of claim 20, the operations further comprising:

determining that the first user has correctly determined more than a threshold amount of information associated with a first set of one or more assets associated with the medical problem; and in response to determining that the first user has correctly determined more than the threshold amount of information associated with the first set of one or more assets associated with the medical problem, enabling, by a server hosting the virtual PBL system and for the first user, access to a second set of one or more assets associated with the medical problem.

\* \* \* \* \*